(12) United States Patent
Igarashi et al.

(10) Patent No.: US 12,283,993 B2
(45) Date of Patent: Apr. 22, 2025

(54) BRANCH RATIO CALCULATION METHOD, BRANCH RATIO CALCULATION DEVICE AND COMPUTER PROGRAM

(71) Applicant: NIPPON TELEGRAPH AND TELEPHONE CORPORATION, Tokyo (JP)

(72) Inventors: Ryo Igarashi, Musashino (JP); Masamichi Fujiwara, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 124 days.

(21) Appl. No.: 18/015,742

(22) PCT Filed: Jul. 29, 2020

(86) PCT No.: PCT/JP2020/029095
§ 371 (c)(1),
(2) Date: Jan. 12, 2023

(87) PCT Pub. No.: WO2022/024269
PCT Pub. Date: Feb. 3, 2022

(65) Prior Publication Data
US 2023/0261750 A1 Aug. 17, 2023

(51) Int. Cl.
*H04B 10/272* (2013.01)
*H04Q 11/00* (2006.01)

(52) U.S. Cl.
CPC ....... *H04B 10/272* (2013.01); *H04Q 11/0067* (2013.01); *H04Q 2011/0086* (2013.01)

(58) Field of Classification Search
CPC .................................................. H04B 10/272
See application file for complete search history.

(56) References Cited

U.S. PATENT DOCUMENTS

| 2005/0135735 | A1* | 6/2005 | Deutsch | H04B 10/2537 385/24 |
| 2010/0111537 | A1* | 5/2010 | Cheng | H04J 14/0282 398/82 |
| 2021/0194589 | A1* | 6/2021 | Kawakita | H04L 12/44 |
| 2023/0082934 | A1* | 3/2023 | Hara | H04B 10/25891 398/142 |

FOREIGN PATENT DOCUMENTS

| CN | 103179006 | * | 6/2013 | ............ H04L 12/28 |
| JP | H05-136745 A | | 6/1993 | |

OTHER PUBLICATIONS

P. Lafata et al., "Perspective Application of Passive Optical Network with Optimized Bus Topology", Journal of Applied Research and Technology, vol. 10, No. 3, pp. 340-345, Jun. 2012.

* cited by examiner

*Primary Examiner* — Nathan M Cors

(57) ABSTRACT

A branch ratio calculation method in an optical communication system constituting a tree-structured network in which a first communication device is used as a root node, a plurality of optical splitters are used as intermediate nodes, and a plurality of second communication devices are used as leaf nodes, the method including a calculation step of calculating branch ratios of the plurality of optical splitters based on a length of a transmission path between the first communication device and the optical fiber in order from a hierarchy of the tree-structured network so that the second communication device receives light transmitted by the first communication device at a target intensity.

5 Claims, 12 Drawing Sheets

BRANCH RATIO CALCULATION METHOD, BRANCH RATIO CALCULATION DEVICE AND COMPUTER PROGRAM

CROSS-REFERENCE TO RELATED APPLICATIONS

This application is a 371 U.S. National Phase of International Application No. PCT/JP2020/029095, filed on Jul. 29, 2020. The entire disclosure of the above application is incorporated herein by reference.

TECHNICAL FIELD

The present invention relates to a branch ratio calculation method, a branch ratio calculation device and a computer program.

BACKGROUND ART

A passive optical network (PON) system is known as an optical communication system. In optical communication using the PON, an optical line terminal (OLT) installed on a communication company station side and an optical network unit (ONU) installed on a subscriber's house side are connected by an optical fiber. An optical splitter is provided in the middle of the optical fiber, and the optical splitter separates and synthesizes optical signals transmitted and received between the OLT and the ONU.

FIG. 10 is a diagram illustrating an example of an optical communication system 100.

The optical communication system 100 includes an OLT 90, ONUs 91-1, ..., and 91-(N+1), symmetrical optical splitters 92-1, ..., and 92-N, branch fibers 93-1, ..., and 91-N, and a trunk fiber 94.

In the following description, for an item common to the ONUs 91-1, ..., and 91-(N+1), "ONUs 91-1, ..., and 91-(N+1)" is expressed as "ONU 91" by omitting a part of the reference numeral. Further, the "symmetrical optical splitters 92-1, ..., and 92-N", and the "branch fibers 93-1, ..., and 93-N" are also similarly referred to as the "symmetrical optical splitter 92" and the "branch fiber 93", respectively. The OLT 90 is an OLT installed on a communication company station side. The ONU 91 is an ONU installed on a subscriber's house side. The symmetrical optical splitter 92 is provided with one input port and two output ports, and branches an optical signal inputted to one input port and outputs the optical signal from the two output ports. The intensities of the optical signals output from the two output ports are equal. The symmetrical optical splitter 92 is provided on the trunk fiber 94.

The OLT 90 and the ONU 91-(N+1) are connected by the trunk fiber 94. The ONUs 91, ..., and 91-N are connected to the symmetrical optical splitter 92 provided on the trunk fiber 94 by the branch fibers 93, ..., and 93-N, respectively. The symmetrical optical splitter 92 branches the optical signal (downlink signal) transmitted from the OLT 90 side and outputs the downlink signal branched to the branch fiber 93 and the trunk fiber 94 to be connected. Further, intensities of the two downlink signals generated as a result of the branching of the downlink signal by the symmetrical optical splitter 92 are equal. Therefore, the intensity of the downlink signal generated as a result of the branching of the downlink signal by the symmetrical optical splitter 92 is half the intensity of the downlink signal being branched. Similarly, the symmetrical optical splitter 92 branches the optical signal (uplink signal) from the ONU 91 and outputs the branched uplink signal to the trunk fiber 94. The intensities of two uplink signals generated as a result of the symmetrical optical splitter 92 branching the uplink signal are equal. Therefore, as in the case of the uplink signal, the intensity of the uplink signal generated as a result of the symmetrical optical splitter 92 branching the uplink signal is half the intensity of the uplink signal being branched.

FIG. 11 is a diagram illustrating intensities of optical signals received by the ONUs 91, ..., and 91-3.

In FIG. 11, $P_{tx}$ is the intensity of the optical signal transmitted by the OLT, $P_{min}$ is the minimum reception sensitivity required for the ONU 91 to receive optical signals without error, and $P_1$, $P_2$, and $P_3$ are the intensities of the optical signals received by the ONU91-1, ONU91-2, and ONU91-3, respectively. The transmission distance is the distance between the OLT 90 and each point of the trunk fiber 94.

A graph illustrated in FIG. 11 illustrates a relationship between a transmission distance and a light intensity when $P_{tx}$ is +4 dBm, $P_{min}$ is −18 dBm, a transmission loss of a trunk fiber 14 is 0.5 dBm/km, a distance D between two most closest symmetrical optical splitters 92 is 10 km, and a distance L of the branch fiber 93 is 0 km.

Since the optical signal transmitted by the OLT 90 is subjected to transmission loss by the trunk fiber 14 and branched by the symmetrical optical splitter 92, the intensity of the optical signal received by the ONU 91 becomes weaker as the transmission distance from the OLT 90 is longer or the symmetrical optical splitter 92 through which the optical signal passes is larger. Since, in FIG. 11, $P_1$ is −4 dBm, $P_2$ is −12 dBm, and $P_3$ is −21 dBm and $P_1$ and $P_2$ are larger than $P_{min}$ the ONU 91-1 and ONU 91-2 can correctly receive the optical signal from the OLT 90, but since $P_3$ is smaller than $P_{min}$, the ONU 91-3 cannot correctly receive the optical signal from the OLT 90.

As a method for transmitting an optical signal a longer distance, it has been proposed to use an unequal-branched optical splitter whose branch ratio is not symmetrical (for example, Non Patent Literature 1). FIG. 12 is a diagram illustrating an optical communication system 100 using an unsymmetrical optical splitter 95. The optical communication system 100 illustrated in FIG. 12 has a configuration in which the symmetrical optical splitter 92 in the optical communication system 100 illustrated in FIG. 10 is replaced with the unsymmetrical optical splitter 95. The unsymmetrical optical splitter 95 is provided with one input port and two output ports, and branches an optical signal input to the one input port and outputs the optical signal from the two output ports. The unsymmetrical optical splitter 95 is different from the symmetrical optical splitter 92 in that the intensities of the optical signals output from the two output ports are not necessarily equal.

For example, in an example illustrated in FIG. 11, the unsymmetrical optical splitter 95-1 branches the optical signal transmitted from the OLT 90, outputs the optical signal having an intensity ratio of 2% to the ONU 91-1, and outputs the optical signal having the remaining intensity ratio of 98% to the unsymmetrical optical splitter 95-2. The unsymmetrical optical splitter 95-2 branches the optical signal transmitted from the OLT 90 side, outputs the optical signal having an intensity ratio of 6% to the ONU 91-2, and outputs the optical signal having the remaining intensity ratio of 94% to the unsymmetrical optical splitter 95-3. The unsymmetrical optical splitter 95-3 branches the optical signal transmitted from the OLT 90 side, outputs the optical signal having an intensity ratio of 20% to the ONU 91-3, and outputs the optical signal having the remaining intensity ratio of 80% to the unsymmetrical optical splitter 95-4.

In the optical communication system 100 illustrated in FIG. 12, the unsymmetrical optical splitter 95 close to the OLT 90 adjusts the branch ratio so that the intensity of the optical signal output to the trunk fiber 94 becomes large, thereby suppressing the intensity of the optical signal received by the ONU 91 from being reduced due to branching of the optical signal transmitted by the OLT 90.

FIG. 13 is a graph illustrating the relationship between the transmission distance and the light intensity in the optical communication system 100 illustrated in FIG. 12. Conditions of the optical splitter are the same as those in the graph of FIG. 11, and $P_{tx}$ is +4 dBm, $P_{min}$ is −18 dBm, the transmission loss of the trunk fiber 14 is 0.5 dBm/km, the distance D between the two most closest symmetrical optical splitters 92 is 10 km, and the distance L of the branch fiber 93 is 0 km. In FIG. 13, $P_1$ is −18 dBm and $P_2$ and $P_3$ are also approximately −18 dBm. Therefore, the ONU 91 and the ONU 92-3 can correctly receive the optical signal from the OLT 90. Further, by reducing the intensity of the optical signal propagating through the branch fiber 94, the intensity of the light propagating through the trunk fiber 93 can be relatively increased, and the OLT 90 can transmit the optical signal farther to the ONU 91.

CITATION LIST

Non Patent Literature

[PTL 1] P. Lafata et al., "Perspective Application of Passive Optical Network with Optimized Bus Topology", Journal of Applied Research and Technology", vol. 10, no. 3, pp. 340-345, June 2012.

SUMMARY OF INVENTION

Technical Problem

However, a method for calculating the optimum branch ratio of each unsymmetrical optical splitter for maximizing the transmission distance of the optical signal has not been established.

An object of the present invention is to provide a branch ratio calculation method for calculating an optimal branch ratio of each unsymmetrical optical splitter in an optical communication system including unsymmetrical optical splitters.

Solution to Problem

An aspect of the present invention is to provide a branch ratio calculation method in an optical communication system constituting a tree-structured network in which a first communication device is used as a root node, a plurality of optical splitters are used as intermediate nodes, and a plurality of second communication devices are used as leaf nodes, the method including a calculation step of calculating branch ratios of the plurality of optical splitters based on a length of a transmission path between the first communication device and the optical fiber in order from a hierarchy of the tree-structured network so that the second communication device receives light transmitted by the first communication device at a target intensity.

Advantageous Effects of Invention

According to the present invention, in the optical communication system including the unsymmetrical optical splitter, an optimum branch ratio of each unsymmetrical optical splitter can be calculated.

DESCRIPTION OF EMBODIMENTS

First Embodiment

Figure 1:
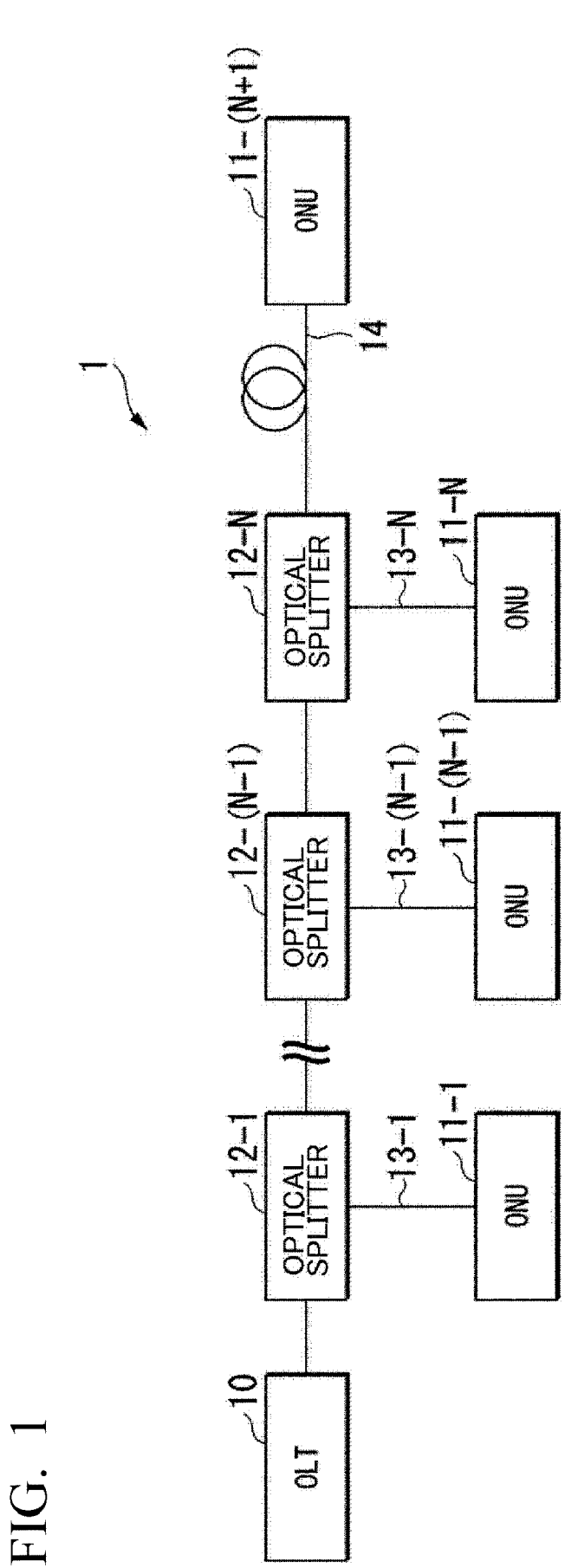
FIG. 1 is a diagram illustrating an example of a configuration of an optical communication system according to a first embodiment.

FIG. 1 is a diagram illustrating an example of a configuration of an optical communication system 1 according to a first embodiment.

The optical communication system 1 includes an OLT 10, ONUs 11-1, . . . , and 11-(N+1), optical splitters 12-1, . . . , and 12-N, branch fibers 13-1, . . . , and 13-N, and a trunk fiber 14. In the following description, for an item common to the ONUs 11-1, . . . , and 11-(N+1), "ONUs 11-1, . . . , and 11-(N+1)" is expressed as "ONU 11" by omitting parts of the reference numeral. Further, the "optical splitters 12-1, . . . , and 12-N", and the "branch fibers 13-1, . . . , and 13-N" are also similarly referred to as the "optical splitter 12" and the "branch fiber 13," respectively.

Figure 9:
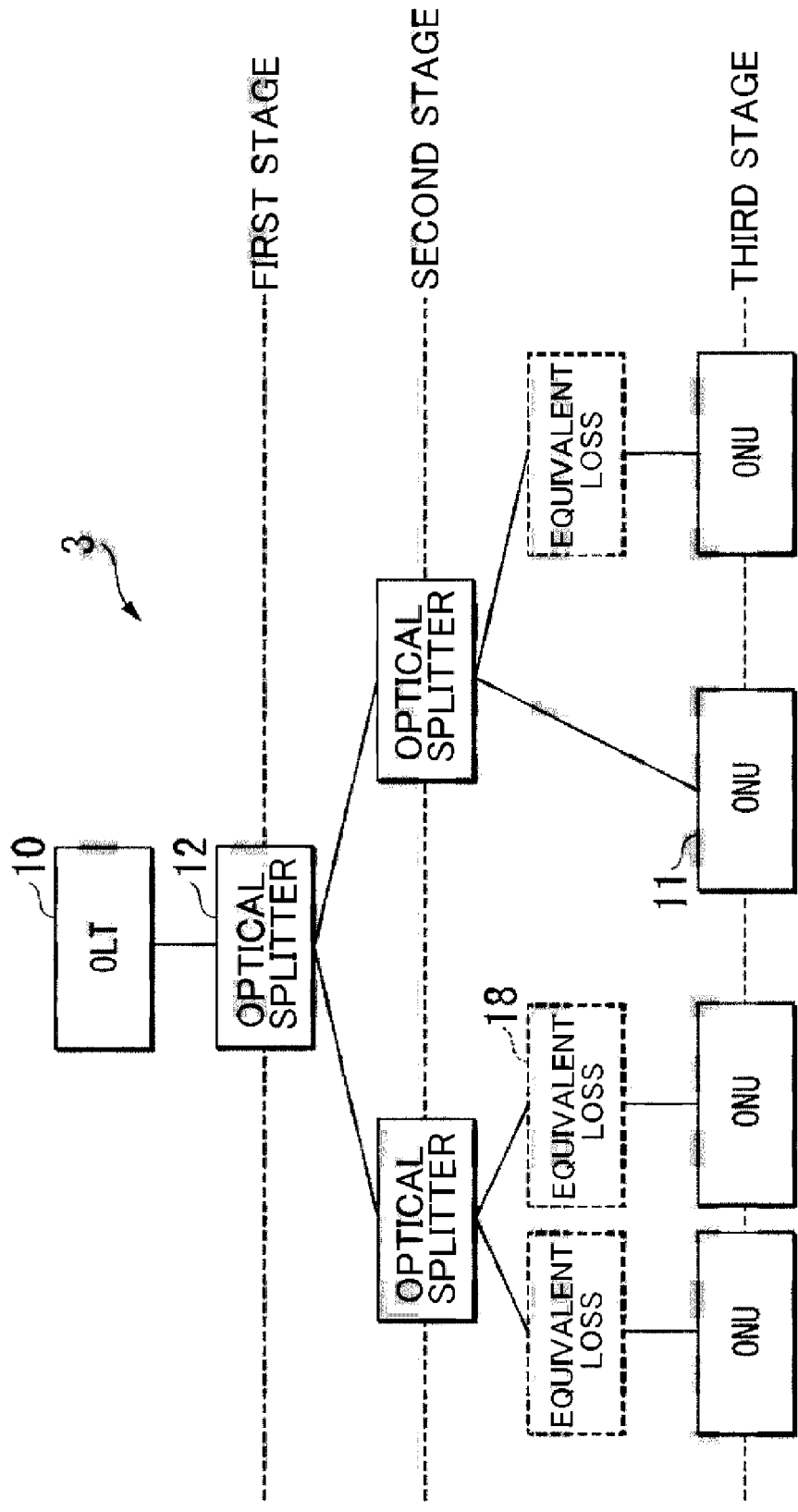
FIG. 9 is a diagram illustrating an example of the optical communication system to which the calculation method according to the second embodiment is applied.
Figure 10:
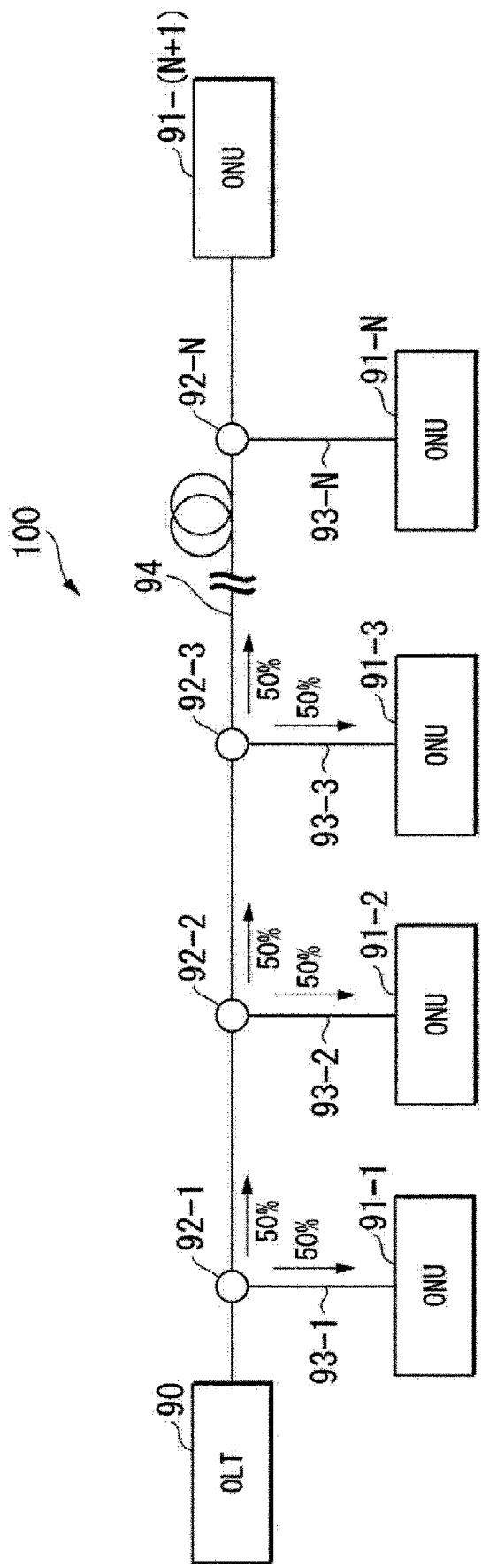
FIG. 10 is a diagram illustrating the optical communication system.
Figure 11:
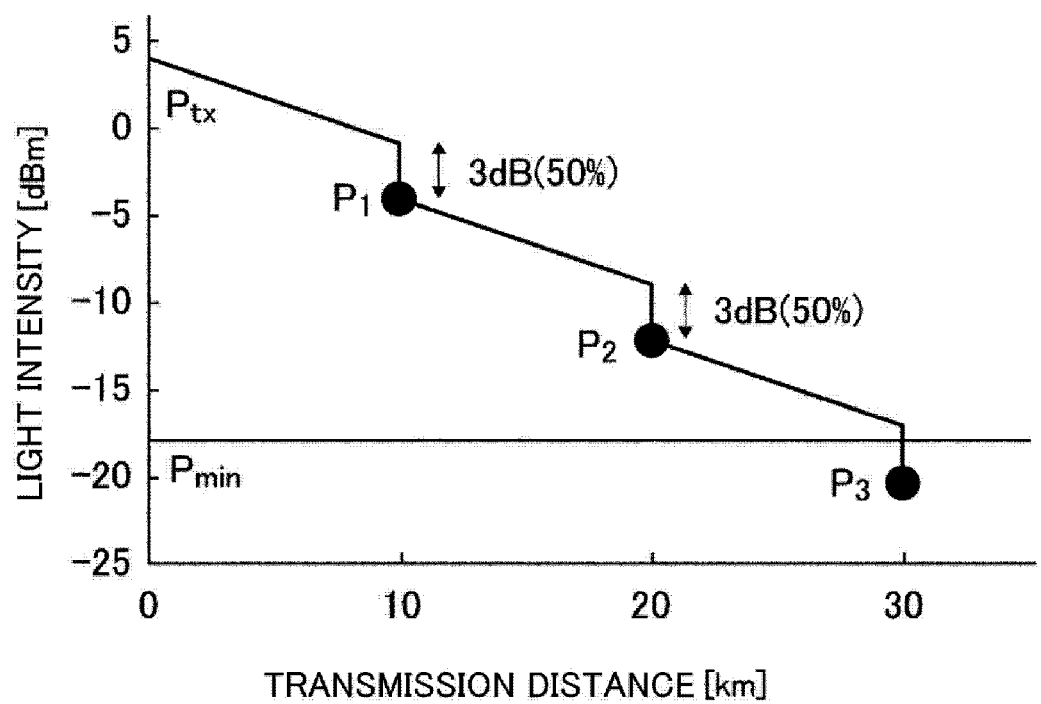
FIG. 11 is a diagram illustrating an intensity of an optical signal received by an ONU.
Figure 12:
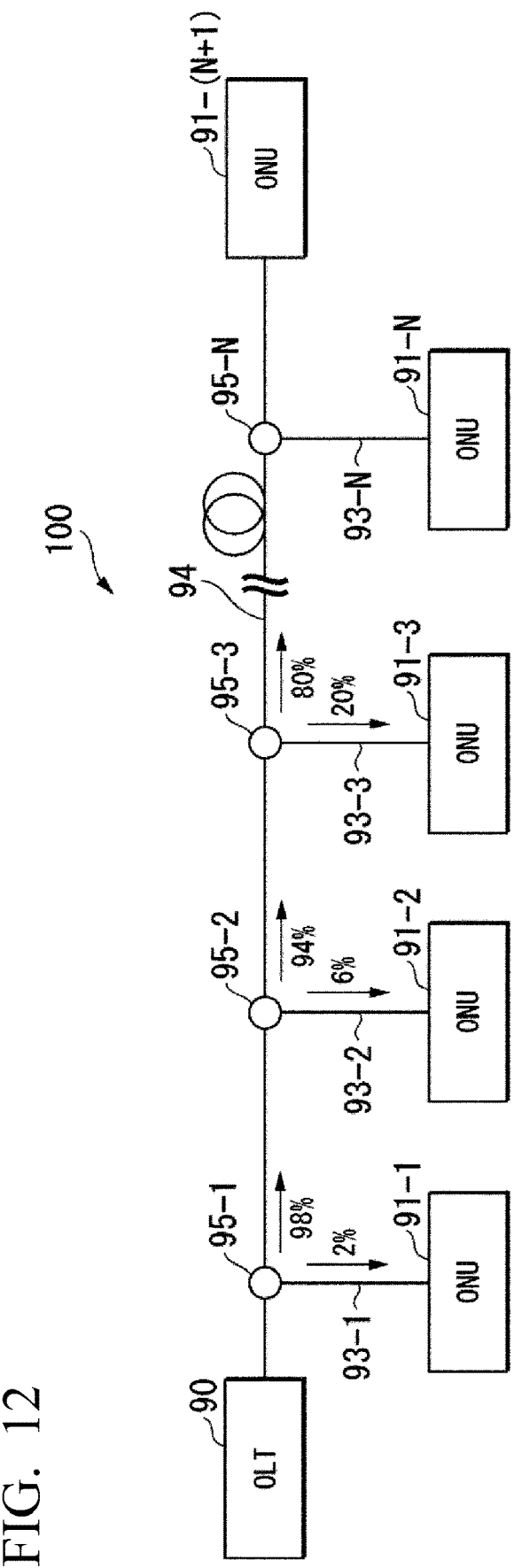
FIG. 12 is a diagram illustrating the optical communication system using an unsymmetrical optical splitter.
Figure 13:
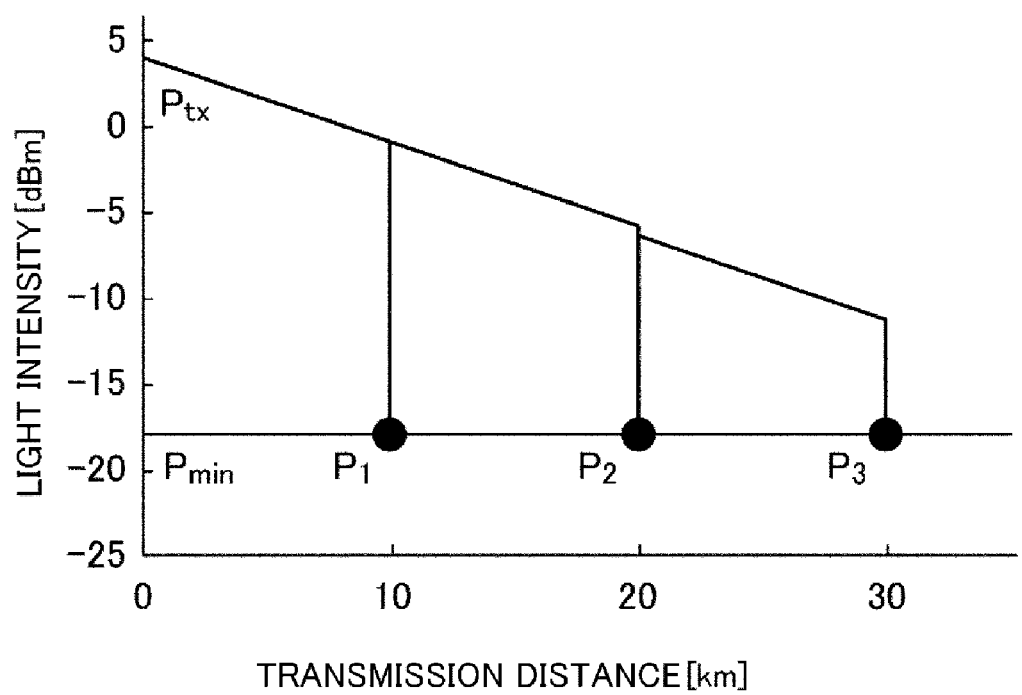
FIG. 13 is a graph showing a relationship between a transmission distance and a light intensity in the optical communication system.

The OLT 10, the ONU 11, the optical splitter 12, the branch fiber 13, and the trunk fiber 14 of the optical communication system 1 corresponds to the OLT 90, the ONU 91, the unsymmetrical optical splitter 95, the branch fiber 93, and the trunk fiber 94 of the optical communication system 100 illustrated in FIG. 9, respectively.

The OLT 10 and the ONU 11-(N+1) are connected by the trunk fiber 14. The optical splitters 12-1, . . . , and 12-N are provided on the trunk fiber 14. The ONUs 11, . . . , and 11-N are connected to the optical splitter 12 provided on the trunk fiber 14 by the branch fibers 13, . . . , and 13-N, respectively.

The optical splitter 12 branches the optical signal transmitted from the OLT 10 side and outputs the optical signal branched to the branch fiber 13 and the trunk fiber 14 to be connected. That is, the optical communication system 1 constitutes a tree-structured network in which the OLT 10 is used as a root node, the optical splitters 12, . . . , 12-N are used as intermediate nodes, and the ONU 11-(N+1) is used as leaf node.

<Definition of Properties of Optical Communication System>

Figure 2:
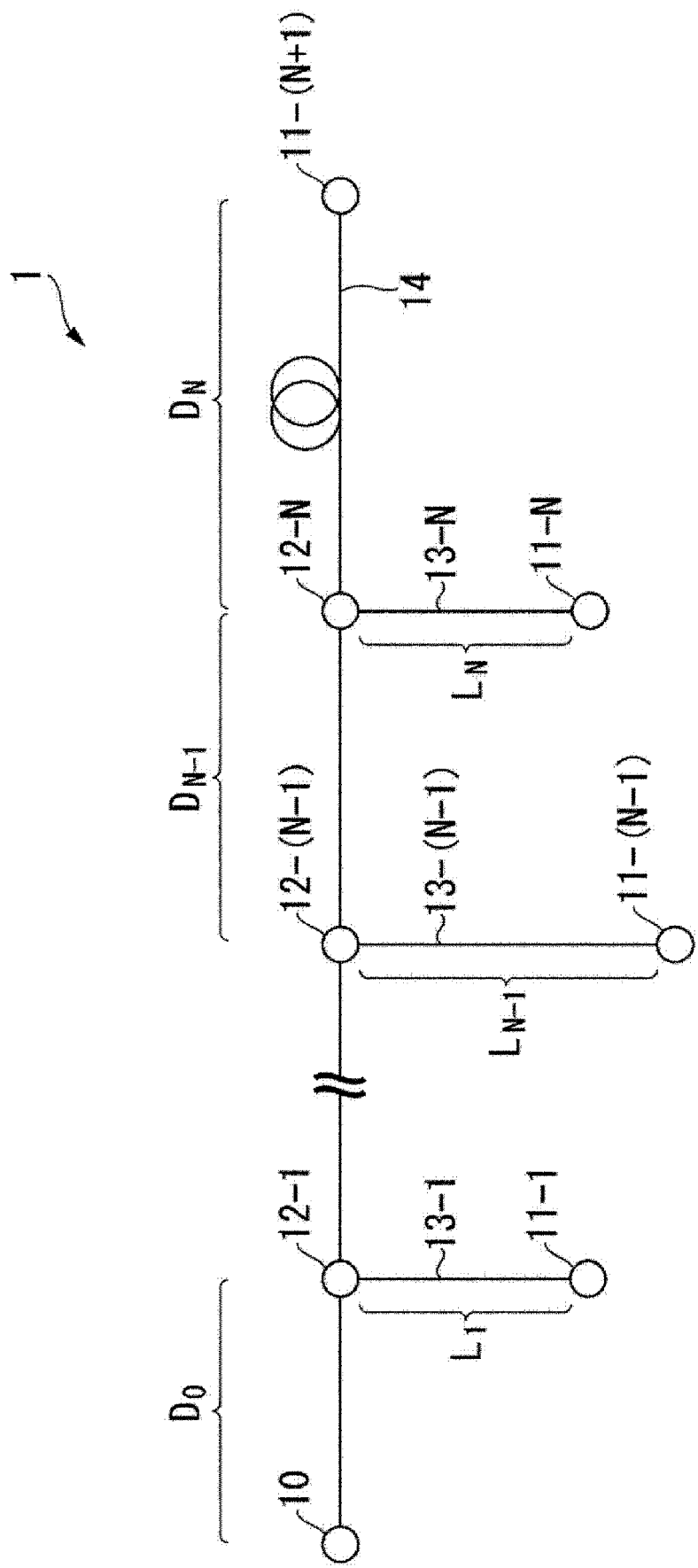
FIG. 2 is a diagram illustrating a distance of a branch fiber and a trunk fiber of the optical communication system according to the first embodiment.

FIG. 2 is a diagram illustrating a distance of the branch fiber 13 and the trunk fiber 14 of the optical communication system 1 according to the first embodiment.

The distances of the branch fibers 13, . . . , and 13-N are defined as $L_1, \ldots,$ and $L_N$, respectively. For $1 \leq n \leq N-1$, the distance between the optical splitter 12-$n$ and the optical splitter 12-$n$ is defined as $D_n$. In addition, Do is defined as a distance between the OLT 10 and the optical splitter 12-1 and $D_N$ is defined as a distance between the optical splitter 12-N and the ONU 11-(N+1).

For $1 \leq n \leq N$, the transmittance of the optical splitter 12-$n$ in a trunk fiber direction is defined as $S_n$, and the transmittance of the optical splitter 12-$n$ in the branch fiber 13-$n$ direction is defined as $T_n$. For $1 \leq n \leq N$, the sum of the transmittance $S_n$ and the transmittance $T_n$ is 1, and both $S_n$ and $T_n$ are 0 or more and 1 or less. The branch ratio of the optical splitter 12-$n$ is defined as $S_n : T_n$. The range of values that $S_n$ and $T_n$ can take is called a specified range of 0 or more and 1 or less. An optical splitter having $S_n$ and $T_n$ as characteristic values that do not fall within the specified range cannot be designed.

Figure 3:
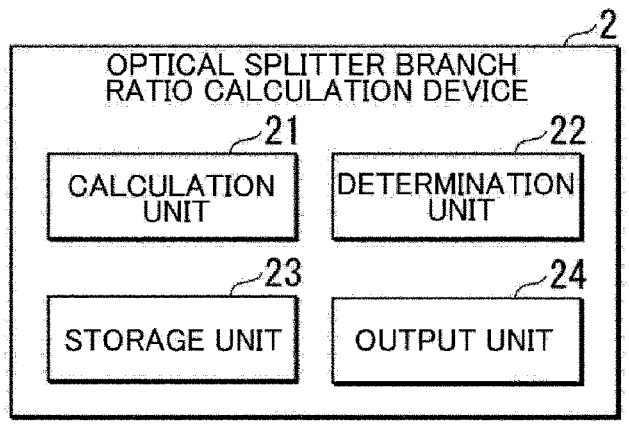
FIG. 3 is a diagram illustrating a configuration example of an optical splitter branch ratio calculation device according to the first embodiment.

FIG. 3 is a diagram illustrating a configuration example of an optical splitter branch ratio calculation device 2 according to the first embodiment.

The optical splitter branch ratio calculation device 2 includes a calculation unit 21, a determination unit 22, and a storage unit 23.

The calculation unit 21 calculates the branch ratio of the optical splitter 12. The determination unit 22 determines whether or not to perform calculation again based on the result calculated by the calculation unit 21. The storage unit 23 stores the result calculated by the calculation unit 21. An output unit 24 outputs the calculation result instructed by the determination unit 22 from the storage unit 23 to the outside.

<Calculation Method of Calculation Unit 21>

Figure 4:
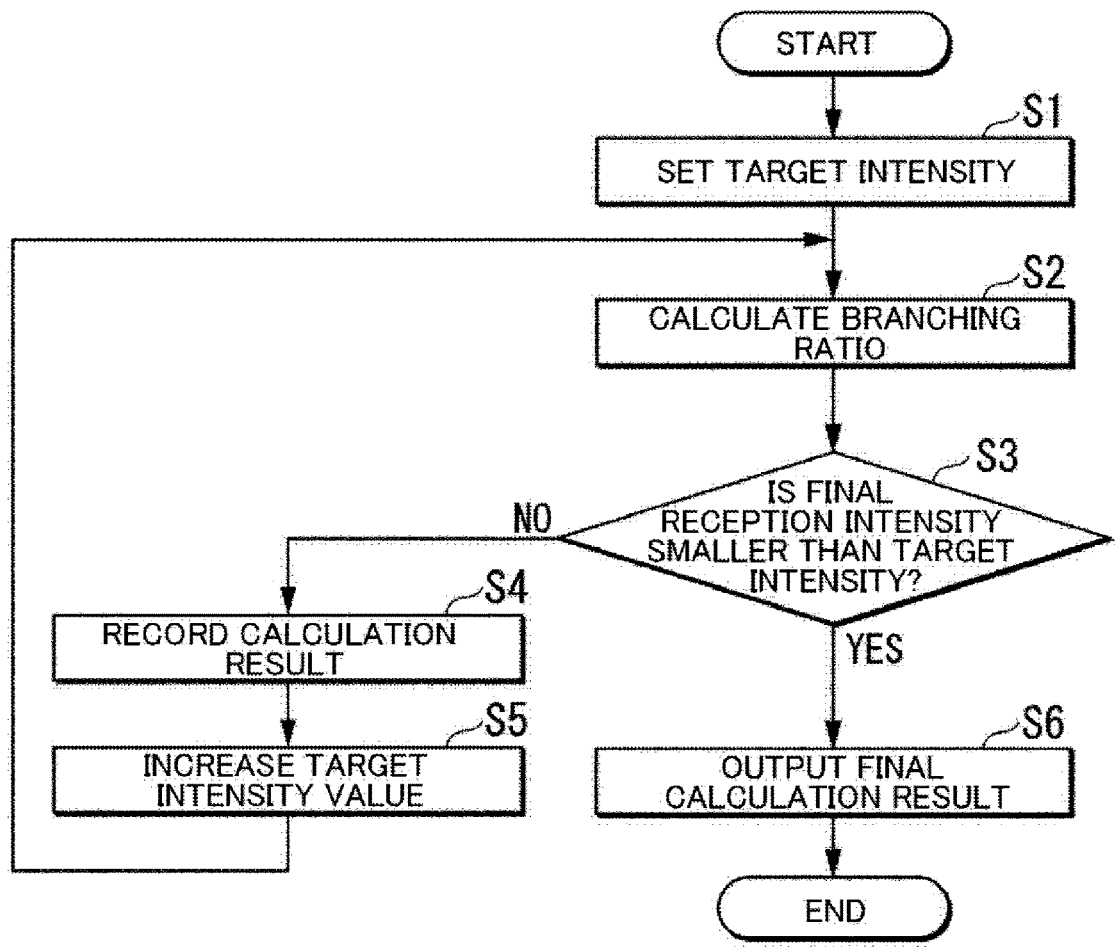
FIG. 4 is a flowchart illustrating an operation of the optical splitter branch ratio calculation device according to the first embodiment.

FIG. 4 is a flowchart illustrating an operation of the optical splitter branch ratio calculation device 2 according to the first embodiment.

First, the calculation unit 21 sets a target intensity of an optical signal received by the ONU 11 (Step S1). The calculation unit 21 sets, for example, the minimum reception sensitivity as an initial value of the target intensity. The calculation unit 21 calculates the branching ratio (branch ratio) of the optical splitter 12 and a final reception intensity which is the reception intensity of the ONU 11-(N+1) (Step S2). A specific calculation method of the branch ratio and the reception intensity by the calculation unit 21 will be described later.

The determination unit 22 compares the final reception intensity with the target intensity (Step S3). In a case where the final reception intensity is equal to or more than the target intensity (Step S3: NO), the branch ratio of the optical splitter 12 calculated by the calculation unit 21 in Step S2 is recorded in the storage unit 23 (Step S4). Thereafter, the calculation unit 21 increases the value of the target intensity (Step S5), and returns the processing to Step S2. The calculation unit 21 adds, for example, a predetermined unit intensity value to the value of the target intensity. In a case where the final reception intensity is less than the target intensity (Step S3: YES), the output unit 24 outputs the latest calculation result recorded in the storage unit 23 to the outside (Step S6). That is, the output unit 24 discards the calculation result in which the final reception intensity calculated this time becomes less than the target intensity, and adopts the calculation result in which the final reception intensity calculated last time becomes equal to or more than the target intensity.

Next, a method of calculating the branch ratio of the optical splitter 12 by the calculation unit 21 will be described. In the case of $2 \leq n \leq N$, where a transmission intensity of the optical signal output from the OLT 10 is defined as $P_{tx}$ and a transmission loss per unit length of the branch fiber 13 and the trunk fiber 14 is defined as $\alpha$dB/m, the reception intensity $P_{Rx}$ of the optical signal received by the ONU 11-$n$ is expressed by Expression (1).

[Math. 1]

$$P_{Rx}(n) = P_{tx} \times \prod_{i=1}^{n-1} S_i \times T_n \times 10^{\frac{\alpha \times (\sum_{i=0}^{n-1} D_i + L_n)}{10}} \quad (1)$$

In the case of n=1, $P_{Rx}(n)$ is expressed by Expression (2).

[Math. 2]

$$P_{Rx}(1) = P_{tx} \times T_1 \times 10^{\frac{\alpha \times (D_0 + L_1)}{10}} \quad (2)$$

Here, it is assumed that the reception intensity $P_{Rx}(n)$ becomes equal to the target intensity $P_0$ when $1 \leq n \leq N$. The target intensity $P_0$ is an arbitrarily determined value, and is set to, for example, a small value close to the minimum reception sensitivity $P_{min}$. However, $P_0$ is at least a value equal to or greater than the minimum reception sensitivity $P_{min}$. Expression (3) representing $T_n$ in the case of $2 \leq n \leq N$ and Expression (4) representing $T_n$ in the case of n=1 (that is, $T_1$) are derived from the condition that the reception intensity $P_{Rx}(n)$ is equal to the target intensity $P_0$ and Expressions (1) and (2).

[Math. 3]

$$T_n = \frac{P_0}{P_{tx} \times \prod_{i=1}^{n-1} S_i \times 10^{\frac{\alpha \times \sum_{i=0}^{n} D_i}{10}}} \quad (3)$$

[Math. 4]

$$T_1 = \frac{P_0}{P_{tx} \times 10^{\frac{\alpha D_i}{10}}} \quad (4)$$

The calculation unit 21 uses Expressions (3) and (4) to calculate the value of $T_n$ from the smaller value of n. That is, the calculation unit 21 determines the branch ratio of the optical splitter 12 in order from the shallower hierarchy of the tree structure. Specifically, first, the calculation unit 21 calculates the value of $T_1$ by Expression (4). Since the sum of $S_1$ and $T_1$ is 1, the calculation unit 21 calculates the value of $S_1$ using the value of $T_1$. Next, the calculation unit 21 calculates the value of $T_2$ by Expression (3) using the value of $S_1$. By repeating this calculation, the calculation unit 21 calculates the values of $S_n$ and $T_n$ in the case of $1 \leq n \leq N$.

After calculating the values of $S_n$ and $T_n$ in the case of $1 \leq n \leq N$, the calculation unit 21 calculates the reception intensity $P_{Rx}(N+1)$ of the optical signal received by ONU 11-(N+1), that is, the final reception intensity. The final reception intensity $P_{Rx}(N+1)$ is expressed by Expression (5).

[Math. 5]

$$P_{Rx}(N+1) = P_{tx} \times \prod_{i=1}^{N} S_i \times 10^{\frac{\alpha \sum_{i=0}^{N} D_i}{10}} \quad (5)$$

The final reception intensity $P_{Rx}(N+1)$ is different from the reception intensities $P_{Rx}(1), \ldots,$ and $P_{Rx}(N)$ and does not necessarily match the target intensity $P_0$. This is because $P_{Rx}(n)$ represented by Expressions (1) and (2) is in the range of $1 \leq n \leq N$. When the final reception intensity $P_{Rx}(N+1)$ is greater than the target intensity $P_0$, there is still room for increasing the target intensity $P_0$. Generally, the reception intensity of the optical signal should be large in order to secure a margin. Therefore, the calculation unit 21 adds a predetermined unit intensity value to the value of the target intensity $P_0$, and calculates the branch ratio of the optical splitter 12 using Expressions (3) and (4) again.

When the final reception intensity $P_{Rx}(N+1)$ is equal to or less than the target intensity $P_0$, there is no room for increasing the target intensity $P_0$. Furthermore, when the final reception intensity $P_{Rx}(N+1)$ is the target intensity $P_0$ or less, the final reception intensity $P_{Rx}(N+1)$ may be the minimum reception sensitivity $P_{min}$ or less. In this case, ONU 11-(N+1) cannot receive the optical signal transmitted from the OLT 10. Therefore, the calculation unit 21 discards the calculation result in which the final reception intensity calculated this time becomes less than the target intensity, and the output unit 24 outputs the calculation result in which the final reception intensity calculated last time becomes equal to or greater than the target intensity. Accordingly, the optical splitter branch ratio calculation device 2 calculates the branch ratio of the optical splitter 12 to be received with the maximum target intensity which can be realized by the ONU 11.

A designer of the optical communication system 1 sets the branch ratio of each optical splitter 12 based on the calculation result output from the optical splitter branch ratio calculation device 2. Then, the designer constructs the optical communication system 1 by incorporating the set optical splitter 12 into the optical communication system 1. The optical splitter branch ratio calculation device 2 may output the calculation result to a manufacturing device of the optical splitter 12 (not illustrated). In this case, the manufacturing device manufactures the optical splitter 12 having a desired branch ratio based on the calculation result inputted from the optical splitter branch ratio calculation device 2.

<Action and Effect>

In this manner, according to the first embodiment, the optical splitter branch ratio calculation device 2 sets the target intensity $P_0$ of the optical signal received by the ONU 11, and repeats the operation of increasing the value of the target intensity $P_0$ and calculating the optical splitter branch ratio. As a result, the optical splitter branch ratio calculation device 2 can calculate the branch ratio of the optical splitter that has the maximum intensity of the optical signal received by the ONU 11 and that all the ONUs 11 can receive the optical signal.

Second Embodiment

The optical splitter branch ratio calculation device 2 according to the first embodiment calculates the branch ratio of the optical splitter 12 from the branch ratio of the optical splitter 12 close to the OLT 10. That is, the optical splitter branch ratio calculation device 2 calculates $S_1$ and $T_1$ first, then calculates $S_2$ and $T_2$, and finally calculates $S_N$ and $T_N$. The optical splitter branch ratio calculation device 2 according to the second embodiment calculates the branch ratio of the optical splitter 12 farthest from the OLT 10. That is, the optical splitter branch ratio calculation device 2 calculates $S_N$ and $T_N$ first.

Calculation Method Second Embodiment

A calculation method of the branch ratio of the optical splitter 12 by the optical splitter branch ratio calculation device 2 according to the second embodiment will be described. In the second embodiment, the optical splitter branch ratio calculation device 2 calculates the branch ratio of the optical splitter 12 so that the loss received by the optical signal is equal between all ONUs 11 and the OLT 10. First, the optical splitter branch ratio calculation device 2 calculates the branch ratio of the optical splitter 12-N so that the loss received by the optical signal between the optical splitter 12-N and the ONU 11-N and the loss received by the optical signal between the optical splitter 12-N and the ONU 11-(N+1) are equal to each other. The loss received by the optical signal between the optical splitter 12-N and the ONU 11 is expressed by Expression (6).

[Math. 6]

$$T_N \times 10^{\frac{\alpha L_N}{10}} \quad (6)$$

The product of the transmittance expressed by Expression (6) and the path loss is defined as "total loss". The total loss received by the optical signal between the optical splitter 12-N and the ONU 11-(N+1) is expressed by Expression (7).

[Math. 7]

$$S_N \times 10^{\frac{\alpha D_N}{10}} \quad (7)$$

When the total losses expressed by Expressions (6) and (7) are equal to each other, the intensities of the optical signals received by the ONU 11-(N+1) and the ONU 11-N are equal to each other. Since the sum of $S_N$ and $T_N$ is 1, $S_N$ is expressed by Expression (8).

[Math. 8]

$$S_N = \frac{10^{\frac{\alpha L_N}{10}}}{10^{\frac{\alpha D_N}{10}} + 10^{\frac{\alpha L_N}{10}}} \quad (8)$$

Next, the total loss received by the optical signal between the optical splitter 12-(N−1) and the ONU 11-(N−1) and the total loss received by the optical signal between the optical splitter 12-(N−1) and the ONU 11-(N+1) are considered to be equal to each other. The total loss received by the optical signal between the optical splitter 12-(N−1) and ONU 11-(N−1) is expressed by Expression (9).

[Math. 9]

$$T_{N-1} \times 10^{\frac{\alpha L_{N-1}}{10}} \quad (9)$$

The total loss received by the optical signal between the optical splitter 12-(N−1) and ONU 11-(N+1) is expressed by Expression (10).

[Math. 10]

$$S_N \times S_{N-1} \times 10^{\frac{\alpha D_N}{10}} \times 10^{\frac{\alpha D_N}{10}} \quad (10)$$

The total losses expressed by Expressions (9) and (10) are equal to each other. Furthermore, since the sum of and is 1, is expressed by Expression (11).

[Math. 11]

$$S_{N-1} = \frac{10^{\frac{\alpha L_{N-1}}{10}}}{10^{\frac{\alpha D_{N-1}}{10}} \times S_N \times 10^{\frac{\alpha D_N}{10}} + 10^{\frac{\alpha L_{N-1}}{10}}} \quad (11)$$

The optical splitter branch ratio calculation device 2 repeats this calculation until $S_1$ is calculated, so that the branch ratio of the optical splitter 12 is calculated. That is, the optical splitter branch ratio calculation device 2 determines the branch ratio of the optical splitter 12 in order from the deeper hierarchy of the tree structure.

Figure 5:
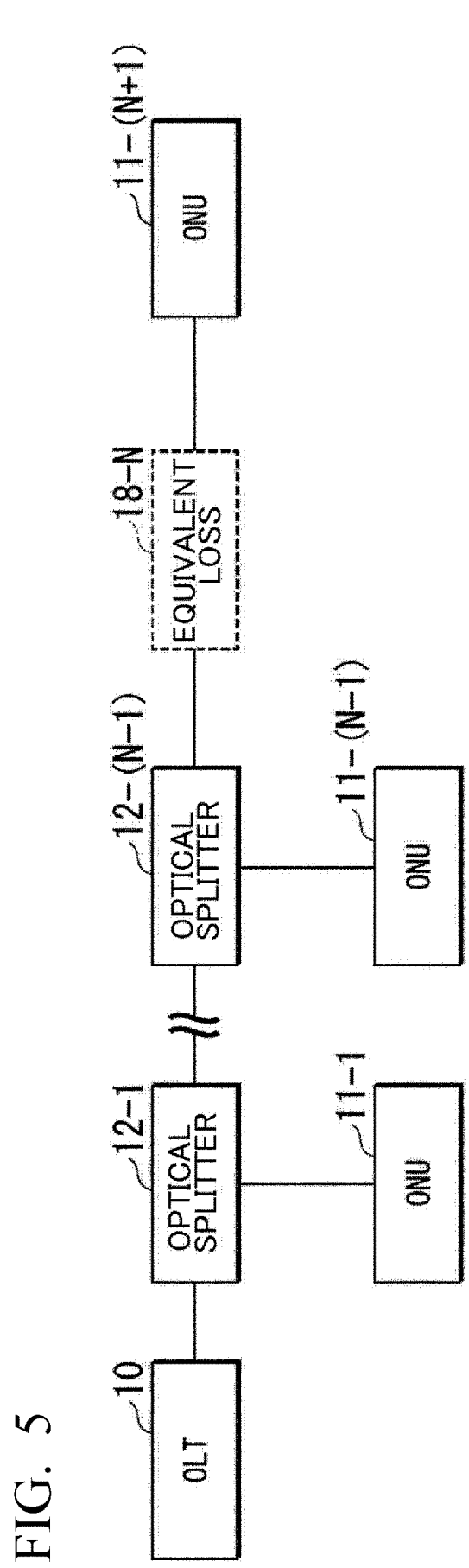
FIG. 5 is a simplified diagram of an optical communication system according to a second embodiment.

FIG. 5 is a simplified diagram of the optical communication system 1 according to the second embodiment.

The calculation method of the branch ratio of the optical splitter 12 according to the second embodiment can be easily understood when assuming that the optical communication system 1 has an equivalent loss 18 as illustrated in FIG. 5. In FIG. 5, the loss $A_N$ given to the optical signal by an equivalent loss 18-N is equal to the total loss received by the optical signal between the optical splitter 12-N and ONU 11-(N+1). The loss $A_N$ is expressed by Expression (12).

[Math. 12]

$$A_N = S_N \times 10^{\frac{\alpha D_N}{10}} = \frac{10^{\frac{\alpha L_N}{10}} \times 10^{\frac{\alpha D_N}{10}}}{10^{\frac{\alpha D_N}{10}} + 10^{\frac{\alpha L_N}{10}}} \quad (12)$$

<Action and Effect>

As described above, according to the second embodiment, the optical splitter branch ratio calculation device 2 sequentially calculates the branch ratio of the optical splitter 12-N to the branch ratio of the optical splitter 12-1 so that the loss between ONU 11 and OLT 10 is equal in all ONUs 11. Thus, the optical splitter branch ratio calculation device 2 can calculate the optimum branch ratio of the optical splitter 12 by one calculation.

OTHER EMBODIMENTS

Modification Example 1

Although the embodiments of the present invention have been described in detail above with reference to the drawings, the specific configuration is not limited to such embodiments, and includes any designs and the like without departing from the spirit and scope of the present invention.

For example, in a case where the distances $L_n$ and $D_n$ of the fibers are not known in advance, the optical communication system 1 may include an optical fiber measurement unit 15.

Figure 6:
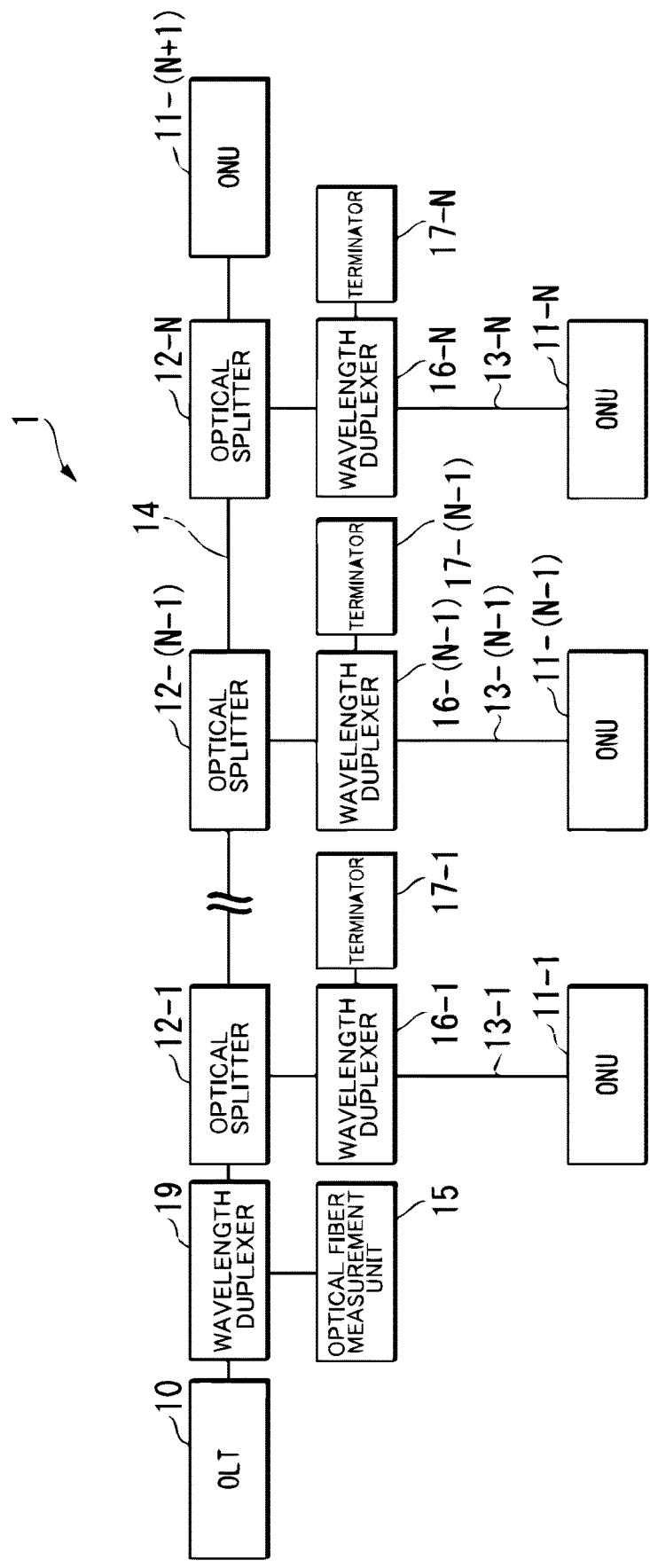
FIG. 6 is a diagram illustrating the optical communication system including an optical fiber measurement unit.

FIG. 6 is a diagram illustrating the optical communication system 1 including the optical fiber measurement unit 15. The optical fiber measurement unit 15 measures the distance of the trunk fiber 14. An example of the optical fiber measurement unit 15 includes an optical time domain reflectometer (OTDR).

The optical communication system 1 illustrated in FIG. 6 includes a wavelength multiplexer/demultiplexer 19, the optical fiber measurement unit 15, a wavelength multiplexer/demultiplexer 16, and a terminator 17 in addition to the optical communication system 1 according to the first embodiment.

The wavelength multiplexer/demultiplexer 19 multiplexes the optical signal inputted from the OLT 10 and the light input from the optical fiber measurement unit 15 and outputs them to the optical splitter 12-1. In addition, the wavelength multiplexer/demultiplexer 19 demultiplexes the light inputted from the optical splitter 12-1 and outputs the light to the OLT 10 and the optical fiber measurement unit 15. The optical fiber measurement unit 15 outputs light to the wavelength multiplexer/demultiplexer 19. In addition, the optical fiber measurement unit 15 measures the input light to confirm the state of the fiber. The wavelength multiplexer/demultiplexer 16 demultiplexes the light input from the optical splitter 12, outputs the optical signal output from the OLT 10 to the ONU 11, and outputs the light output from the optical fiber measurement unit 15 to the terminator 17. The terminator 17 terminates the input light.

The optical communication system 1 is provided with a wavelength multiplexer/demultiplexer 16 and a terminator 17, and the light outputted from the optical fiber measurement unit 15 does not pass through the branch fiber 13. The optical fiber measurement unit 15 measures the position of the optical splitter 12 and measures the distance $D_n$ of the trunk fiber 14. Since the distance $L_n$ of the branch fiber 13 cannot be measured, the calculation unit 21 calculates the branch ratio of the optical splitter 12 by substituting the expected longest length of the branch fiber into $L_n$.

The wavelength multiplexer/demultiplexer 16 is provided to prevent Rayleigh scattering from occurring in the branch fiber 13 and affecting the measurement when the optical fiber measurement unit 15 measures the length of the optical fiber. In addition, the terminator 17 is provided to prevent the light from being reflected at the position of the terminator 17 and affecting the measurement when the optical fiber measurement unit 15 measures the length of the optical fiber. Therefore, in a case where it is considered that the measurement is not affected, the optical communication system 1 may not include wavelength multiplexer/demultiplexer 16 and the terminator 17.

Modification Example 2

Under the given conditions, the optical splitter may not be feasible due to reasons such as a small transmission intensity $P_{tx}$. For example, in a case where the target intensity $P_0$ is set to the minimum reception sensitivity $P_{min}$ in the first embodiment and $0 \leq S_n \leq 1$ is not satisfied by any of the optical splitters 12, it is not possible for all ONUs 11 to receive the optical signal. In this case, the optical communication system 1 recalculates by increasing the transmission intensity $P_{tx}$ or selecting the ONU 11 and reducing the number of ONUs.

Modification Example 3

In the calculation method of the branch ratio of the optical splitter 12 according to the second embodiment, in a case where there is the optical splitter 12 whose branch ratio cannot be changed among the optical splitters 12, a limitation is imposed on the branch ratio of the optical splitter which can be set. In these cases, the optical splitter branch ratio calculation device 2 sets the larger total loss among the total losses calculated in two paths being branch destinations of the optical splitter 12 whose branch ratio cannot be changed to the equivalent loss 18.

Modification Example 4

Figure 7:
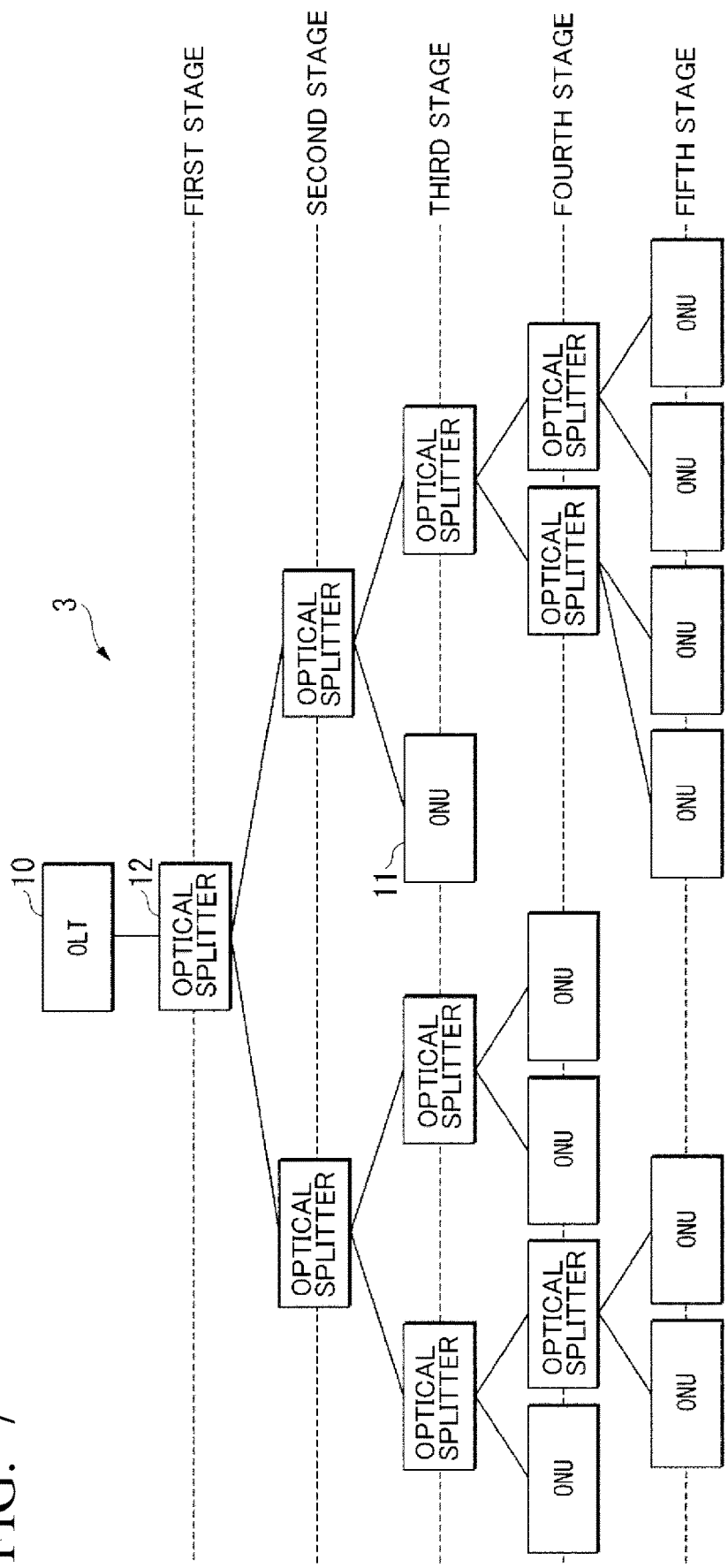
FIG. 7 is an example of the optical communication system employing a tree-type network.

The calculation method of the branch ratio of the optical splitter 12 according to the second embodiment is not limited to the optical communication system 1 employing a bus type network illustrated in FIG. 1. FIG. 7 is an example of the optical communication system 3 employing a tree-type network. The calculation method of the branch ratio of the optical splitter 12 according to the second embodiment can also be applied to the optical communication system 3. The optical splitter branch ratio calculation device 2 receives an input of a network structure of the optical communication system 3, and specifies the number of stages of each of the ONU 11 and the optical splitter 12. The number of stages of the ONU 11 and the optical splitter 12 is represented by the number of optical splitters 12 existing between the OLT 10 and the ONU 11 or the optical splitter 12. For example, the number of stages of the optical splitter 12 directly connected to the OLT 10 is the first stage. In addition, the number of stages of the optical splitter 12 or the ONU 11 directly connected to the optical splitter 12 of the first stage is the second stage.

Figure 8:
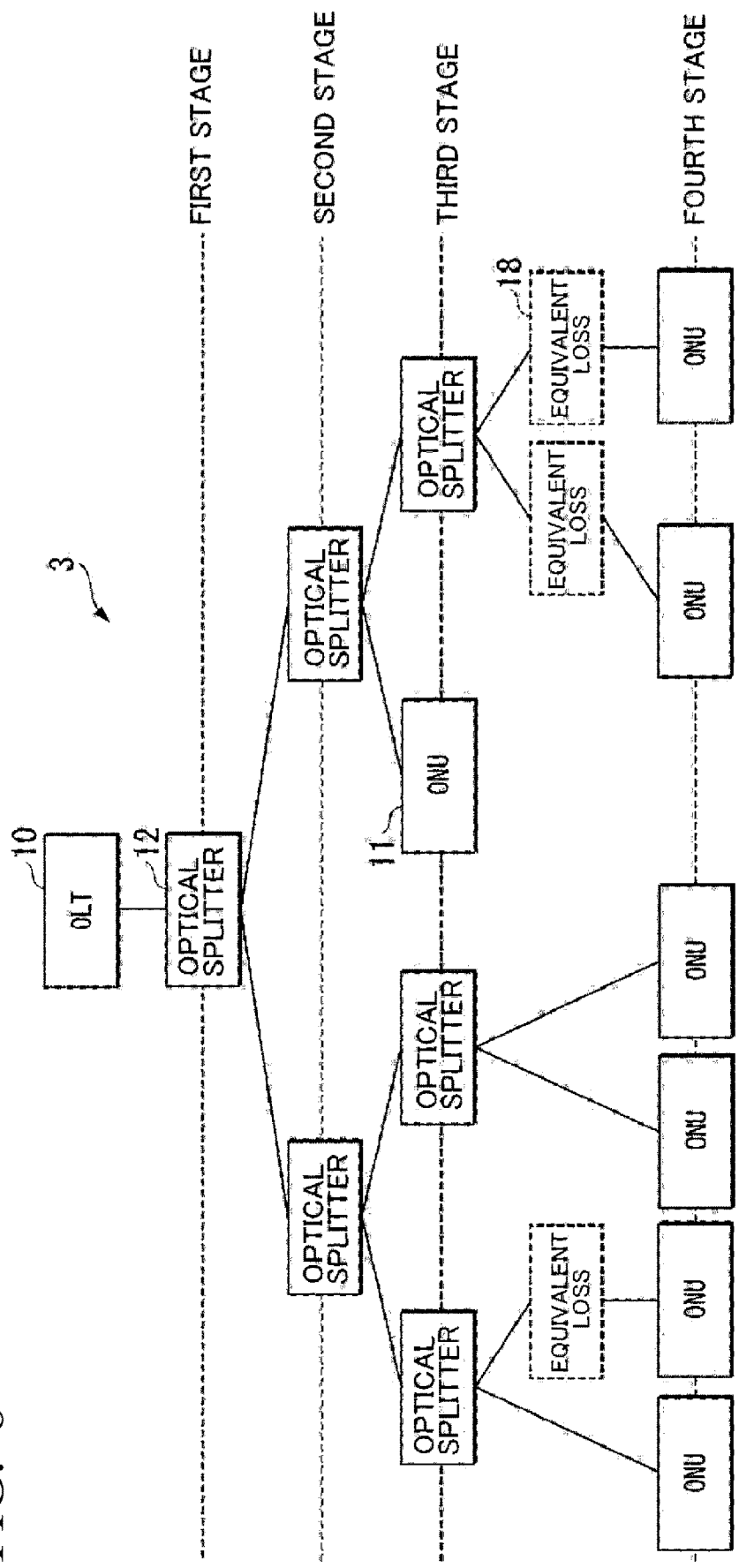
FIG. 8 is a diagram illustrating an example of the optical communication system to which a calculation method according to a second embodiment is applied.

Next, the optical splitter branch ratio calculation device 2 applies the calculation method of the branch ratio of the optical splitter 12 according to the second embodiment to the ONU 11 having the largest number of stages in the optical communication system 3. FIG. 8 is a diagram illustrating an example of the optical communication system 3 to which the calculation method according to the second embodiment is applied. In FIG. 7, the number of stages of the optical communication system 3 is reduced by replacing the branching from the fourth stage optical splitter 12 to the fifth stage ONU 11 with the equivalent loss 18 and the fourth stage ONU 11. FIG. 9 illustrates a case where the calculation method according to the second embodiment is applied to the optical communication system 3 illustrated in FIG. 8, and the number of stages is reduced to three stages. In this way, the optical splitter branch ratio calculation device 2 can calculate the branch ratio of the optical splitter 12 by decreasing the number of stages of the optical communication system 3.

The optical splitter branch ratio calculation device 2 includes a central processing unit (CPU), a memory, an auxiliary storage device, and the like, which are all connected via a bus. The optical splitter branch ratio calculation device 2 functions as a device including the calculation unit 21, the determination unit 22, the storage unit 23, and the output unit 24 by executing a program. Note that some or all of the functions of the optical splitter branch ratio calculation device 2 may be achieved using hardware such as an application specific integrated circuit (ASIC), a programmable logic device (PLD), or a field programmable gate array (FPGA). The program may be recorded on a computer-readable recording medium. The computer-readable recording medium is, for example, a portable medium such a flexible disk, a magneto-optical disk, a ROM, as a CD-ROM, or a storage apparatus such as a hard disk built in a computer system. The program may be transmitted via an electric communication line.

REFERENCE SIGNS LIST 1, 3, 100 Optical communication system
10, 90 OLT
11, 91 ONU
12 Optical splitter
13, 93 Branch fiber
14, 94 Trunk fiber
15 Optical fiber measurement unit
16, 19 Wavelength multiplexer/demultiplexer
17 Terminator
18 Equivalent loss
2 Optical splitter branch ratio calculation device
21 Calculation unit
22 Determination unit
23 Storage unit
24 Output unit
92 Symmetrical optical splitter
95 Unsymmetrical optical splitter

The invention claimed is:

1. A branch ratio calculation method in an optical communication system constituting a tree-structured network in which a first communication device is used as a root node, a plurality of optical splitters are used as intermediate nodes, and a plurality of second communication devices are used as leaf nodes, the method comprising:
   calculating branch ratios of each optical splitter of the plurality of optical splitters based on a length of a transmission path between the first communication device and each optical splitter in order from a hierarchy of the tree-structured network so that the plurality of second communication devices receives light transmitted by the first communication device at a target intensity-; and
   setting the branch ratio of each optical splitter in the optical communication system to the calculated branch ratio,
   wherein calculating the branch ratios so that the plurality of second communication devices receive the light at the target intensity in order from a shallower side of the hierarchy of the tree-structured network for the plurality of optical splitters.

2. The branch ratio calculation method according to claim 1, wherein
   the target intensity is equal to or greater than a minimum reception sensitivity of the plurality of second communication devices.

3. The branch ratio calculation method according to claim 1, the calculation is repeated so that an intensity of light received by one or more communication devices becomes small, the one or more communication devices are of the plurality of second communication devices and the one or more communication devices relate to the deepest layer of the tree-structured network, and calculating the branch ratio of the optical splitter so that the intensity of the light received by the one or more communication devices related to the deepest layer becomes minimum and more than the target intensity.

4. An optical communication system constituting a tree-structured network in which a first communication device is used as a root node, a plurality of optical splitters are used as intermediate nodes, and a plurality of second communication devices are used as leaf nodes,
wherein the optical communication system comprises a device, the device comprising:
a processor and a memory having computer program instructions stored thereon, wherein the computer program instructions, when executed by the processor, perform to:
calculate branch ratios of each optical splitter of the plurality of optical splitters based on a length of a transmission path between the first communication device and each optical splitter in order from a hierarchy of the tree-structured network so that the plurality of second communication devices receives light transmitted by the first communication device at a target intensity-; and
set the branch ratio of each optical splitter in the optical communication system to the calculated branch ratio,
calculate the branch ratios so that the plurality of second communication devices receive the light at the target intensity in order from a shallower side of the hierarchy of the tree-structured network for the plurality of optical splitters.

5. A non-transitory computer-readable medium storing a computer program for causing a computer to execute steps comprising:
in an optical communication system constituting a tree-structured network in which a first communication device is used as a root node, a plurality of optical splitters are used as intermediate nodes, and a plurality of second communication devices are used as leaf nodes,
calculating branch ratios of each optical splitter of the plurality of optical splitters based on a length of a transmission path between the first communication device and each optical splitter in order from a hierarchy of the tree-structured network so that plurality of the second communication devices receives light transmitted by the first communication device at a target intensity-; and
setting the branch ratio of each optical splitter in the optical communication system to the calculated branch ratio,
wherein calculating the branch ratios so that the plurality of second communication devices receive the light at the target intensity in order from a shallower side of the hierarchy of the tree-structured network for the plurality of optical splitters.

* * * * *